United States Patent Office 3,030,308
Patented Apr. 17, 1962

3,030,308
ANTIFREEZE COMPOSITION
Robert J. Agnew, Groves, Tex., James K. Truitt, Beacon, N.Y., and William D. Robertson, Woodbridge, Conn., assignors to Texaco Inc., a corporation of Delaware
No Drawing. Filed May 28, 1958, Ser. No. 738,309
16 Claims. (Cl. 252—74)

This invention relates to novel corrosion and foam inhibited single phase antifreeze compositions and to aqueous solutions thereof. The invention also concerns a method of producing the novel antifreezes and their aqueous solutions. In addition, the invention covers a method of preventing corrosion of metals which come in contact with such compositions.

It is well known that the uninhibited aqueous antifreeze solutions cause serious corrosion of metals during service. These antifreeze mixtures promote corrosion of brass, copper, solder, steel, iron and aluminum in heat exchange apparatus such as the cooling systems of internal combustion engines. The last four metals are particularly susceptible to corrosion by antifreeze mixtures.

A large number of corrosion inhibitors and combinations thereof have been employed by the prior art in antifreeze compositions. The antifreezes having the inhibitors dissolved only in the freezing point depressant and without any oil layer are known as single phase antifreezes; and those which have inhibitors dissolved in a separate oil layer are known as the two phase antifreezes. Although many of the prior art inhibited antifreezes are generally satisfactory, they are often deficient in one or more aspects. For example, they may, when used as a coolant in automobile cooling systems deteriorate the rubber radiator hose, creep, foam, form scums and/or fail to provide adequate corrosion protection for one or more metals forming such cooling systems. Furthermore, those of the two-phase type cannot be readily shipped in bulk because of the difficulty of recovering the product with the proper proportion of oil and glycol.

An object of this invention is to provide new antifreeze compositions and aqueous solutions thereof which afford superior corrosion protection to metals normally found in heat exchange apparatus. Another object is to provide an antifreeze which is non-foaming, scum resistant, resistant to creep and does not deteriorate rubber. Still another object is to provide an antifreeze which is of simple preparation, and which may be shipped in large volume bulk containers such as drums or tank cars.

In accordance with this invention and the objects thereof, we have discovered single phase antifreeze compositions and aqueous solutions thereof comprising a water soluble liquid freezing point depressant, magnesium metaborate ($MgB_2O_4$) and an alkali metal molybdate (Alk.Me.-$MoO_4$) which provide superior corrosion protection to metals normally found in heat exchange systems, and which also are foam resistant, scum resistant, compatible with rubber hosing, and of simple preparation.

We have further found magnesium metaborate and alkali metal molybdate in combination act synergistically in the novel antifreeze compositions to retard the corrosion of cast iron. This synergistic action is particularly desirable since a major portion of an automobile cooling system is comprised of cast iron.

In addition, we have discovered that magnesium metaborate in our novel antifreeze compositions acts as an outstanding foam suppressor in addition to being an effective corrosion inhibitor. In direct contrast many of the well known antifreeze corrosion inhibitors such as borax actually promote foaming.

Still further we have found that our novel antifreeze compositions do not form insoluble scums when brought in combination with sulfonated soluble oils. In distinction, antifreeze compositions containing calcium metaborate form these undesirable scums in the presence of said soluble oils. This non-scum feature of our novel compositions is most desirable since sulfonated soluble oils are often employed in heat exchange systems as supplementary corrosion inhibiting additives.

The freezing point depressants of our novel compositions are any of the water miscible liquid alcohols such as the monohydroxy lower alkyl alcohols and the liquid polyhydroxy alcohols such as the alkylene and dialkylene glycols. Specific examples of the alcohols contemplated herein are methanol, ethanol, propanol, isopropanol, butanol, ethylene glycol, diethylene glycol, propylene glycols, butylene glycols and mixtures thereof. The freezing point depressant should generally constitute between about 10 and 100 volume (vol.) percent of the novel antifreeze compositions. A preferred glycol is ethylene glycol, which as sold commercially, often contains a small amount up to 10% by weight of diethylene glycol. The term ethylene glycol as used herein is intended to read either on the pure or commelcial compound. This is also true for the other freezing point depressant alcohols contemplated herein.

We include within the definition of magnesium metaborate the hydrous (e.g. $MgB_2O_4.3H_2O$) as well as the anhydrous forms thereof. The quantity of magnesium metaborate employed in the novel antifreezes should generally be between about 0.1 and 5% by weight (wt.) based on the weight of the alcohol freezing point depressant. Preferably magnesium metaborate concentrations are between about 0.2 and 1.5 wt. percent.

We include within the definition of alkali metal molybdate the hydrous as well as anhydrous forms thereof. Several specific examples of the alkali metal molybdate contemplated herein are sodium molybdate, sodium molybdate dihydrate and potassium molybdate. The quantity of alkali metal molybdate employed should generally be between 0.5 and 5%, preferably between 1.3 and 4% by weight based on the weight of the alcohol freezing point depressant. The preferred alkali metal molybdates are the sodium molybdates.

Among the metals to be protected by the disclosed novel antifreeze compositions are brass, copper, solder, steel, iron and aluminum.

Water may be combined with the antifreezes of this invention in any and all proportions to form the aqueous antifreeze solutions thereof. When aqueous solutions of the novel antifreezes are to be used as coolants in automotive cooling systems, the water miscible liquid alcohol freezing point depressant should generally constitute at least about 10 vol. percent, preferably between about 20 and 65 vol. percent of the aqueous antifreeze solution. The corresponding water content should, therefore, constitute less than about 90 vol. percent, preferably between about 35 and 80% by volume, of the aqueous antifreeze solutions.

It is to be noted the freezing point of the aqueous antifreeze coolants is substantially determined by the quantity and particular freezing point depressant used therein. For example, a minimum freezing point of approximately −60° F. is obtained with about 65% ethylene glycol by volume. Further increase or decrease in the ethylene glycol concentration raises the freezing point.

In the preparation of our novel antifreeze compositions and the aqueous solutions thereof, the magnesium metaborate is conveniently formed in situ by adding boric acid ($H_3BO_3$) and magnesium oxide (MgO) in a mol ratio of between about 1.5:1 and 2.5:1, preferably 2:1, to a water soluble liquid alcohol, and the reaction mixture is agitated at a temperature between about 50 and 250° F., preferably between 130 and 200° F., until a clean homogeneous solution is formed. This reaction is normally conducted under atmospheric pressure; however, if the reaction temperature exceeds the boiling point of the freezing points depressant, superatmospheric pressure is applied to maintain the freezing point depressant in a liquid state. In addition to magnesium metaborate, water is also a product of the reaction, but it is not an essential ingredient of the antifreeze concentrate as far as corrosion inhibition and anti-foam properties are concerned. The formed water combines with the magnesium metaborate as water of hydration to form the magnesium metaborate hydrates. To the resultant solution alkali metal molybdate is added as a solid or as an alcoholic solution with mixing and the mixing is continued until visual observation reveals a homogeneous product. If desired water then may be added to the antifreeze concentrate to form aqueous solutions thereof.

The following examples serve to illustrate my invention in greater detail.

EXAMPLE I

This example illustrates the method of preparation of the novel antifreeze compositions.

To 96.16 pounds (lbs.) of commercial grade ethylene glycol (4.1% by weight diethylene glycol content), which was continuously stirred during the entire time of the antifreeze preparation, there was added 0.53 lb. of boric acid and the resultant mixture was heated. When a temperature of 170° F. was reached, 0.18 lb. of magnesium oxide was added to the stirred mixture and the mixture temperature was held at 170° F. until all trace of milkiness therein had disappeared. The resulting solution was then cooled to 70° F. and 3.13 lbs. of sodium molybdate dihydrate was added. Stirring was continued until a clear homogeneous product was formed. The preceding quantities produced approximately 10 gallons of final product.

The final product was of the following composition:

| Ingredients | Weight, percent |
| --- | --- |
| Ethylene glycol (commercial grade) | 96.16. |
| Magnesium metaborate trihydrate | 0.71 (0.74% based on the weight of the glycol). |
| Sodium molybdate dihydrate | 3.13 (3.25% based on the weight of the glycol). |

A 50 vol. percent aqueous solution of the above final product was prepared by combining 10 gallons of said final product with 10 gallons of water and stirring for several minutes at room temperature.

EXAMPLE II

This example illustrates the corrosion inhibition effectiveness of the antifreeze compositions of this invention.

The corrosion test employed and which is described below simulates conditions under which corrosion of oxidizable metals is frequently encountered in automotive engine cooling systems containing antifreeze compositions.

The test is conducted in an open-top Pyrex glass cell of cylindrical shape fitted with a sidearm tube having an entrance into the middle section and an entrance into the bottom section of the cell. In addition, an air inlet tube is connected into the middle section of the sidearm tube and an air outlet tube is fitted to the upper side of the cell. The size of the cell is such that when 150 milliliters of liquid is added thereto the liquid's surface level is flush with the bottom edge of the entrance of the sidearm tube into the middle section of the cell.

One hundred fifty (150) milliliters of a 40% by volume antifreeze solution in water is charged to the cell. The water used to dilute the antifreeze to 40% by volume contains a 200 p.p.m. (by weight) chloride ion concentration. The air outlet tube is connected to a water cooled condenser and the air inlet tube is connected to a compressed air source. The open top of the cell is closed with a new rolled cork through which is passed a glass rod ending in a pair of glass hooks. From each hook a weighed test metal strip of known surface area is suspended by passing the hook through the hole in the test strip. The metals subjected to test are copper, brass, solder, cast iron, steel, aluminum and cast aluminum.

The glass rod is adjusted so that the test metal strips are immersed in the test solution. The glass cell is then placed in an oil bath maintained at a temperature of 160° F. and air is passed through the air inlet tube into the portion of the test solution located in the sidearm tube, thereby promoting the circulation of the test solution in the cell. The air was previously scrubbed free of any carbon dioxide by passing it through a solution of 20 wt. percent sodium hydroxide in water. The cell is maintained in the oil bath for a period of 96 hours whereupon the test metal strips are removed. Each test metal strip is freed of corrosion products, dried and reweighed. The weight loss is calculated on the basis of milligrams lost per square decimeter of original surface area of the test strip (mg./sq.dm.).

All the metal strips used in the above tests were of 102 x 12.5 x 1.3 millimeter dimension and had a 4 millimeter diameter hole centered 5 millimeters from one end.

The test metal specimens were prepared for test by degreasing in hot benzene vapor for 30 minutes. Solder specimens were then stored in a desiccator until weighed. Other metals were etched as follows:

(1) Steel—20 minutes in 4 N sulfuric acid, rinsed 3 minutes in hot (180° F.) water and scrubbed with a bristle brush under water.

(2) Cast iron—treated the same as steel except etched for 3 rather than 20 minutes in 4 N sulfuric acid.

(3) Aluminum—5 minutes in 10% (wt.) solution of sodium hydroxide at 140-160° F., rinsed in water and dipped in concentrated nitric acid for 5 seconds.

(4) Cast aluminum—treated same as aluminum except scrubbed with a bristle brush between sodium hydroxide and nitric acid treatments.

(5) Copper and brass—15 seconds in a solution of 3 volumes of concentrated nitric acid and 1 volume of glacial acetic acid.

After etching, the strips were rinsed well in distilled water, wiped with a clean dry cloth to remove excess moisture and dried in an oven at 140° F. for 10-15 minutes. The strips were then cooled in a desiccator and weighed. The test metal specimens were prepared immediately before test and in no case more than 24 hours in advance of the initiation of the test.

Following completion of the test, the strips were scrubbed with a soft bristle brush in water to remove loosely adhering corrosion products. The steel strips were then immersed in an aqueous solution of 5% sulfuric acid at room temperature for 5 minutes, rinsed with water, scrubbed with a soft bristle brush, wiped and dried in an oven. The cast iron specimens were cleaned electrolytically for 1 minute as cathodes with platinum as the anode in an aqueous solution of 5% sulfuric acid at 180° F. using a current density of approximately 15 amperes per square decimeter of surface, then brushed under water, wiper and dried in an oven. Aluminum and cast aluminum specimens were cleaned by immersing in a phosphoric acid-dichromate solution for 10 minutes at 140-160° F., rinsing in water and scrubbing with a brush under water, then wiped and dried in an oven. The phosphoric acid dichromate solution was prepared by dissolving 20 grams of potassium dichromate in 28 milliliters of orthophosphoric acid and diluting with water to 1 liter. Copper, brass and solder specimens were cleaned electrolytically for 3 minutes as cathodes with platinum as the anode in an aqueous solution of 5% sulfuric acid plus 2% pyridine at a temperature of 180° F. and at a current density of approximately 15 amperes per square decimeter of surface area, then immersed in water, scrubbed with a bristle brush and dried in an oven.

After drying in the oven, the strips were cooled in a desiccator and weighed. The correction factors for weight loss of the specimens due to the methods of cleaning specified above were:

Metals: Milligrams
- Steel _____ +0.1
- Cast iron _____ +3.4
- Copper _____ +0.5
- Brass _____ +0.8
- Aluminum _____ +0.4
- Cast aluminum _____ +2.8
- Solder _____ +0.5

Two antifreezes subjected to the above test were designated as antifreeze A and antifreeze B. Antifreeze A is an uninhibited ethylene glycol and antifreeze B is a representative of the novel antifreeze compositions of this invention.

Test data and results are reported below in Table I.

Table I

| Description | Antifreeze A | Antifreeze B |
| --- | --- | --- |
| Composition of test solution, volume percent: | | |
| Water component (200 p.p.m. Cl⁻) | 60 | 60 |
| Antifreeze component | 40 | 40 |
| Composition of antifreeze component, weight percent: | | |
| Ethylene glycol (commercial grade) | 100.00 | 96.16 |
| Magnesium metaborate trihydrate | | 0.71 |
| Sodium molybdate dihydrate | | 3.13 |
| Corrosion loss [1] of test strips, mg./sq.dm.: | | |
| Aluminum (2S) | 6.7 | [2] +0.3 |
| Brass | 3.3 | 3.6 |
| Cast aluminum | 92 | [2] +3.3 |
| Cast iron | 304 | 11.6 |
| Copper | 17 | 3.9 |
| Solder | 40 | 10.5 |
| Steel | 596 | 5.0 |

[1] Corrosion loss for each metal based on the average weight loss/sq.dm. of 2 test strips.
[2] A plus sign (+) indicates a weight gain.

As can be seen from the above table, my novel inhibited antifreeze B substantially reduces the corrosion of aluminum (2S), cast aluminum, cast iron, copper, solder and steel. Although my novel antifreeze representative gave somewhat higher corrosion loss for brass than did the comparative antifreeze A, this loss still remained low.

EXAMPLE III

This example illustrates the synergistic corrosion inhibitor action for cast iron of the magnesium metaborate and the alkali metal molybdate combination in the novel antifreeze compositions of this invention.

Four test antifreeze formulations were subjected to the corrosion test described in Example II. They are respectively designated as antifreezes A, C, D and B.

Antifreeze B is a representative of the novel antifreezes of this invention and antifreezes A, C and D are comparative antifreeze compositions.

Test data and results are reported below in Table II.

Table II

| Description | A | C | D | B |
| --- | --- | --- | --- | --- |
| Composition of the test solution, vol. percent: | | | | |
| Water component, 200 p.p.m. Cl⁻ | 60 | 60 | 60 | 60 |
| Antifreeze component | 40 | 40 | 40 | 40 |
| Composition of antifreeze component, weight percent: | | | | |
| Ethylene glycol (commercial grade) | 100 | 97.14 | 95.83 | 96.16 |
| Magnesium metaborate trihydrate | | 2.86 | | 0.71 |
| Sodium molybdate dihydrate | | | 4.17 | 3.13 |
| Corrosion loss [1] of test strip, mg./sq. dm.: Cast iron | 304 | 161 | 60 | 11.6 |

[1] Corrosion loss for each metal based on average weight loss/sq. dm. of two test strips.

Inspection of the above table shows the magnesium metaborate-alkali metal molybdate combination in the novel antifreeze representative acts synergistically to reduce corrosion of cast iron.

EXAMPLES IV

This example illustrates the desirable foam resistant properties of the novel antifreeze compositions. In addition, the superiority of magnesium metaborate over another alkaline earth metaborate in suppressing scum formation in antifreeze compositions which have a foam producing soluble oil in combination therewith is demonstrated.

The foam test procedure employed consists of placing 250 cc. of an antifreeze-distilled water solution in a clean 800 ml. beaker and stirring the beaker contents with an electric mixer of the household variety operated at a speed of 1000 r.p.m. for a 100 second period while maintaining the test solution temperature at 160° F. At the instant the mixer is cut off, the foam height and the foam collapsed time are measured. The foam collapse time is the interval between the cutting off of the mixer and the appearance of the first stable opening in the foam layer.

In addition to the above test, a modified foam test was employed. It is identical to the above procedure except a sulfonated soluble oil composition was added to the aqueous test solutions to form solutions having a soluble oil content of 10% by volume. The composition of the soluble oil employed, designated as agent X, is as follows:

Ingredients: Weight percent
- Sodium sulfonate oil mixture _____ 16.0
- Gum rosin _____ 4.2
- Naphthenic acid _____ 7.1
- Sodium hydroxide (49 wt. percent in water) __ 2.0
- Ethylene glycol monobutyl ether _____ 1.0
- Water _____ 0.9
- Lubricating oil (Saybolt Universal Viscosity of 70 seconds at 100° F.) _____ 68.8

Six antifreeze compositions were subjected to the previously described foaming and modified foaming tests. These antifreeze formulations are designated as antifreeze A, G, H, I, J and B. Antifreeze A is an uninhibited ethylene glycol. Antifreezes G, H, I and J are comparative inhibited antifreeze compositions and antifreeze B is a representative of the novel composition of this invention.

The data and results of the foaming and modified foaming tests are reported below:

Table III

| Description | A | G | H | I | J | B |
| --- | --- | --- | --- | --- | --- | --- |
| Composition of test solution, vol. percent: | | | | | | |
| Water component (distilled) | 60 | 50 | 60 | 60 | 60 | 60 |
| Antifreeze component | 40 | 50 | 40 | 40 | 40 | 40 |
| Composition of antifreeze component, weight percent: | | | | | | |
| Ethylene glycol (commercial grade) | 100 | 98.57 | 98.87 | 96.68 | 99.27 | 96.16 |
| Magnesium metaborate trihydrate | | | | | 0.73 | 0.71 |
| Borax | | | | 3.32 | | |
| Sodium molybdate dihydrate | | | 2.13 | | | 3.13 |
| Calcium metaborate dihydrate | | 1.43 | | | | |
| Foam height, inches: | | | | | | |
| Test solution | 0 | 0 | ½ | 1⅛ | 0 | 0 |
| Test solution+10 vol. percent agent X | 4⅝ | 1¼ | 4¼ | 4⅛ | 0 | 0 |
| Foam collapse time, seconds: | | | | | | |
| Test solution | 0 | 0 | 5 | 6 | 0 | 0 |
| Test solution+10 vol. percent agent X | >600 | [1] 70 | 259 | 250 | 0 | 0 |

[1] A scum rather than a true foam.

From an inspection of the results reported in above Table III, it is seen that our novel antifreeze compositions represented by antifreeze B does not form a foam or scum even in the presence of a foam and scum producing soluble oil. Furthermore, a comparison of the test data of antifreezes A, G, H and I with the test data of antifreezes J and B demonstrates the superior foam suppressing effect of magnesium metaborate as well as its decided advantage over another alkaline earth metaborate, calcium metaborate, in resisting the formation of insoluble scums.

In other tests conducted on our novel antifreeze compositions in automobile engines no deterioration of rubber radiator hosing was found nor was any excessive creeping by the novel antifreezes observed.

Obviously, many modifications and variations of the invention as hereinbefore set forth may be made without departing from the spirit and scope thereof, and therefore, only such limitations should be imposed as are indicated in the appended claims.

We claim:

1. An antifreeze composition adapted to be added to water consisting essentially of a water-soluble liquid alcohol freezing point depressant containing between about 0.1 and 5% by weight of a magnesium metaborate and between about 0.5 to 5% by weight of an alkali metal molybdate.

2. An antifreeze composition adapted to be added to water consisting essentially of a water-soluble liquid alcohol freezing point depressant containing between about 0.2 and 1.5% by weight of a magnesium metaborate and between about 1.3 and 4% by weight of an alkali metal molybdate.

3. An antifreeze composition in accordance with claim 2 wherein said freezing point depressant is ethylene glycol and said alkali metal molybdate is sodium molybdate.

4. An aqueous antifreeze composition consisting essentially of between about 10 and 100% by volume of a water-soluble liquid alcohol freezing point depressant containing between about 0.1 and 5% by weight of a magnesium metaborate and between about 0.5 and 5% by weight of an alkali metal molybdate, the remainder of said composition being less than about 90% by volume of water.

5. An aqueous antifreeze composition consisting essentially of between about 20 and 65% by volume of a water-soluble liquid alcohol freezing point depressant containing between about 0.2 and 1.5% by weight of a magnesium metaborate and between about 1.3 and 4% by weight of an alkali metal molybdate, the remainder of said composition being between about 35 and 80% by volume of water.

6. An aqueous antifreeze composition in accordance with claim 4 wherein said freezing point depressant is ethylene glycol and said alkali metal molybdate is sodium molybdate.

7. A method of producing an antifreeze composition comprising mixing boric acid and magnesium oxide in a mol ratio of between about 1.5:1 and 2.5:1 in a water-soluble liquid alcohol freezing point depressant at between about 50 and 250° F. until the resultant solution is substantially clear, and then mixing said resultant solution with an alkali metal molybdate, the proportions of said freezing point depressant, said boric acid, magnesium oxide and alkali metal molybdate being adjusted to form said composition containing between about 0.1 and 5% by weight of a magnesium metaborate and between about 0.5 and 5% by weight of said alkali metal molybdate based on the weight of said freezing point depressant.

8. A method in accordance with claim 7 wherein the proportions of said freezing point depressant, said boric acid, said magnesium oxide and said alkali metal molybdate are adjusted to form said compositions containing between about 0.2 and 1.5% by weight of a magnesium metaborate and between about 1.3 and 4% by weight of said alkali metal molybdate based on the weight of said freezing point depressant.

9. A method in accordance with claim 7 wherein said freezing point depressant is ethylene glycol and said alkali metal molybdate is sodium molybdate.

10. A method in accordance with claim 7 wherein said alkali metal molybdate is added as a water-soluble liquid alcohol freezing point depressant solution.

11. A method of producing an aqueous antifreeze composition comprising mixing boric acid and magnesium oxide in a mol ratio of between 1.5:1 and 2.5:1 in a water-soluble liquid alcohol freezing point depressant at between about 50 and 250° F., until the resultant solution substantially clears, and then mixing with said resultant solution an alkali metal molybdate and water, the proportions of said freezing point depressant, said boric acid, said magnesium oxide, said alkali metal molybdate and said water are adjusted to form said composition containing between about 10 and 100% by volume of said freezing point depressant, less than about 90% by volume of said water, between about 0.1 and 5% by weight of a magnesium metaborate and between about 0.5 and 5% by weight of said alkali metal molybdate, said % by wt. of said magnesium metaborate and said alkali metal molybdate being based on the weight of said freezing point depressant.

12. A method in accordance with claim 11 wherein the proportions of said freezing point depressant, said boric acid, said magnesium oxide, said alkali metal molybdate and said water are adjusted to form said composition containing between about 20 and 65% by volume of said freezing point depressant, between about 35 and 80% by volume of said water, between about 0.2 and 1.5% by weight of a magnesium metaborate and between about 1.3 and 4% by weight of said alkali metal molybdate, said % by weight of said magnesium metaborate and said alkali metal molybdate being based on the weight of said freezing point depressant.

13. A method in accordance with claim 11 wherein said freezing point depressant is ethylene glycol, and said alkali metal molybdate is sodium molybdate.

14. A process of inhibiting corrosion of metals which come in contact with antifreeze solutions adapted to be added to water comprising contacting the metal with a composition consisting essentially of a water-soluble liquid alcohol freezing point depressant containing between about 0.1 and 5% by weight of a magnesium metaborate and between about 0.5 to 5% by weight of an alkali metal molybdate.

15. A process in accordance with claim 14 wherein said freezing point depressant is ethylene glycol and said alkali metal molybdate is sodium molybdate.

16. A process of inhibiting corrosion of metals which come in contact with antifreeze solutions comprising contacting the metal with a composition consisting essentially of between about 10 and 100% by volume of a water-soluble liquid alcohol freezing point depressant containing between about 0.1 and 5% by weight of a magnesium metaborate, and between about 0.5 and 5% by weight of an alkali metal molybdate, the remainder of said composition being less than about 90% by volume of water.

References Cited in the file of this patent

UNITED STATES PATENTS

| | | |
|---|---|---|
| 1,911,195 | Kepfer | May 30, 1933 |
| 2,147,409 | Lamprey | Feb. 14, 1939 |
| 2,765,278 | Holter et al. | Oct. 2, 1956 |
| 2,834,735 | Woodle et al. | May 13, 1958 |